United States Patent Office 3,032,966
Patented May 8, 1962

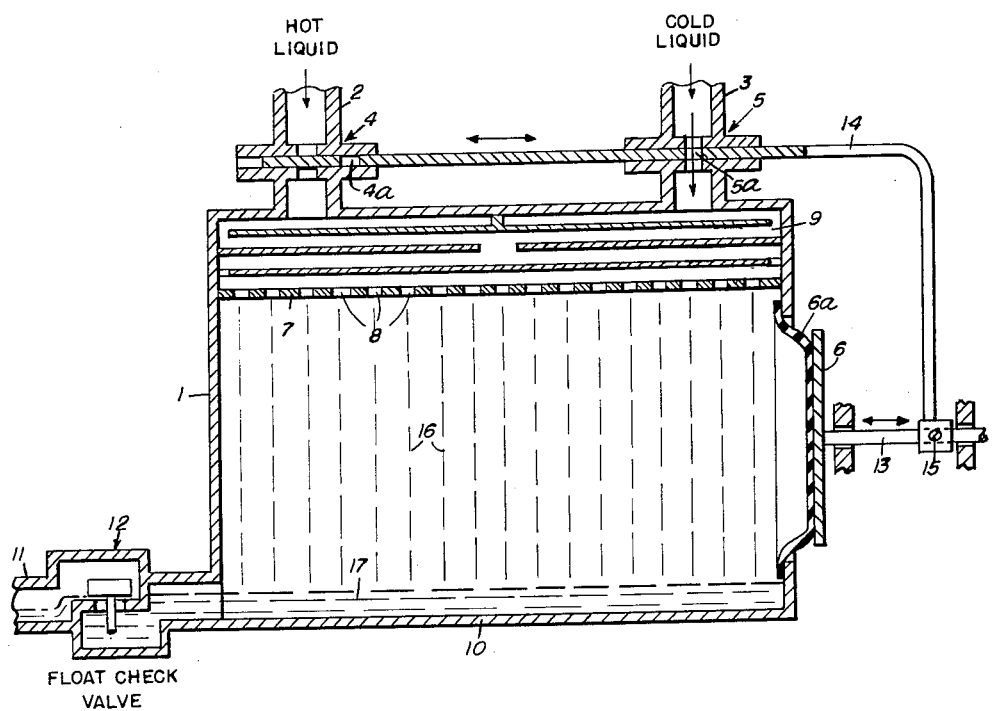

3,032,966
THERMALLY ACTUATED MOTOR
Johan Viktor Abom, Stillestorpsgatan 23 G,
Goteborg, Sweden
Filed Apr. 13, 1960, Ser. No. 21,942
Claims priority, application Sweden Apr. 23, 1959
5 Claims. (Cl. 60—24)

The present invention relates to a motor which operates on an entirely new principle. The motor is essentially characterized by the fact that it comprises a gas chamber having at least one intake for warm liquid and one intake for cold liquid, said intakes being arranged alternately to supply finely divided or diffused liquid to the gas chamber for the purpose of heating and cooling the gas contained in said chamber, thereby providing such pressure variations in the chamber as are necessary for the operation of the motor.

The invention permits inter alia converting the heat of sea currents and the like into energy. Consequently the motor is driven by the hot water of the sea current and by the adjacent cold water. Other propellants than water may also be used. For operation at very low temperatures the warm liquid as well as the cold liquid should preferably be gasoline. In this case as in all others, the liquid having the higher temperature is the warm liquid and the liquid having the lower temperature is the cold liquid.

As a rule the gas in the gas chamber is air, but use can also be made of other gas mixtures and gases, such as hydrogen. The pressure in the gas chamber from which the variations take place, may be atmospheric pressure but also higher and lower pressures may prove suitable under different circumstances.

Further features of the invention and the advantages gained thereby will become apparent from the following description, reference being made to the accompanying drawing which illustrates schematically an embodiment of the motor, chosen by way of example, in longitudinal section.

The gas chamber 1 proper has one intake 2 for warm liquid and one intake 3 for cold liquid. The intakes 2 and 3 are arranged alternately to supply finely divided liquid to the gas chamber for the purpose of heating and cooling the gas contained in the chamber 1. Said alternate supply can be realized by means of values 4 and 5 which are arranged to open and close in accordance with a predetermined program. In the drawing, means of this character is indicated comprising a slide member 14 rigidly connected by an arm and a set screw 15 to the reciprocating power output rod 13 of the motor, slide 14 extending through valves 4 and 5 and having apertures 4a and 5a which control respectively the flow of the warm and cold liquids to the motor. Thus, in the position illustrated in the drawing, the motor diaphragm 6, 6a has reached its extreme righthand position due to expansion of gas in chamber 1, and slide 14 has brought aperture 5a into alignment with the fixed ports of valve 5 so as to permit maximum flow of cold liquid into the motor to cool and contract the gas so as to move diaphragm 6, 6a to the left. When the diaphragm reaches its extreme left hand position valve 5 will be closed and valve 4 will be open so as to admit warm liquid to initiate the expansion portion of the cycle. Obviously, other valve operating means, well known in the art, may be substituted. Thus, heating and cooling of the gas provide such pressure variations in the gas chamber 1 as are required for the operation of the motor. In the illustrated embodiment the gas actuates a diaphragm 6 or the like to produce a reciprocatory movement. However, the gas pressure variations can be used in several ways known per se.

To obtain the necessary heat exchange between liquid and gas it is of the greatest importance that the liquid is supplied to the gas chamber 1 in finely divided or diffused form. In the illustrated embodiment the gas chamber 1 therefore is in the form of a chamber having a flat ceiling 7 with a number of small holes 8 therein for the supply of finely divided or diffused liquid, the arrangement of said holes 8 being preferably such that half the number of holes 8 communicates with the intake 2 for warm liquid while the other half communicates with the intake 3 for cold liquid. The holes 8 communicating with the intake 2 like those communicating with the intake 3 are regularly distributed over the ceiling 7. The means for distributing the warm and cold liquid is schematically illustrated at 9.

Experiments have shown that the holes 8 should suitably have a diameter lying within a range of from 0.1 to 0.7 mm., suitably about 0.4 mm. The distance between the holes 8 should be from 2 to 10 mm., suitably about 7 mm.

The height of the chamber 1 of course can be varied within wide limits but a height of approximately 2 meters is preferred. In this case the motor effects one working cycle per second. At a temperature difference between the cold and the warm liquid of 25° C., it will be possible to obtain a gas temperature difference of 15° C. in the gas chamber. When the liquid is sea water, the cold liquid may have a temperature of about ± 0° C. and the warm liquid a temperature of about 25° C.

When the propellant is sea water the chamber 1 is suitably disposed with floor 10 approximately at sea level. In another embodiment the chamber 1 may be submerged in the sea.

An outlet 11 is arranged to discharge the liquid supplied to the chamber 1 and a valve 12 is provided for said outlet 11 in such a way as to discharge the liquid and prevent flow of gas into or out of chamber 1. As illustrated in the drawing this may be done by means of a non-return float check valve 12 arranged to provide a liquid trap. Thus, the finely divided or diffused liquid 16 collects in a layer of liquid 17 on the bottom and forms a liquid seal in the valve housing to prevent escape of gas. Float valve 12 lifts each time the liquid level rises to discharge the excess liquid, but seats when the liquid level falls slightly, thereby sealing against admission of gas through outlet 11.

Sometimes it is suitable to interconnect several motors of the type provided by the present invention.

While one embodiment only of the invention has been described in the foregoing with reference to the accompanying drawing, it is understood that the invention is not restricted to that particular embodiment but permits of modification within the spirit and scope of the appended claims.

What I claim and desire to secure by Letters Patent is:

1. A motor comprising a chamber containing a gas, first means for introducing finely divided relatively cold liquid into said chamber to contact said gas to cool it and reduce its pressure, second means for introducing finely divided relatively warm liquid into said chamber to contact said gas to heat it and increase its pressure, an outlet for discharging the introduced liquids from said chamber, valve means in said outlet for preventing inward and outward flow of gas and permitting discharge of liquid, whereby said first and second means may be used alternately to cool and heat said gas to vary its pressure, and a movably mounted power transmitting member in contact with said gas and moved by the pressure variations thereof.

2. A motor comprising a chamber, said chamber having gas therein, a pervious wall, and a liquid outlet in its lower portion, valve means in said outlet for preventing inward and outward flow of gas and permitting discharge of liquid, first means for introducing relatively cold liquid into said chamber through said pervious wall in finely divided form to contact said gas to cool it and reduce its pressure, second means for introducing relatively warm liquid into said chamber through said pervious wall in finely divided form to contact said gas to heat it and increase its pressure, whereby said first and second means may be used alternately to cool and heat said gas to vary its pressure, and a movably mounted power transmitting member in contact with said gas and moved by the pressure variations thereof.

3. A motor comprising a chamber having a flat pervious ceiling made pervious by a plurality of small holes therein, a liquid outlet in its lower portion, and a valve in said outlet for controlling the discharge of liquid from said chamber, said chamber having gas therein, first means for introducing relatively cold liquid into said chamber through said ceiling in finely divided form to contact said gas to cool it and reduce its pressure, second means for introducing relatively warm liquid into said chamber through said ceiling in finely divided form to contact said gas to heat it and increase its pressure, whereby said first and second means may be used alternately to cool and heat said gas to vary its pressure, and a movably mounted power transmitting member in contact with said gas and moved by the pressure variations thereof.

4. A motor as defined by claim 3, the holes in said ceiling having a diameter within a range of from about 0.1 to about 0.7 millimeter, the holes being spaced apart a distance between about 2 and about 10 millimeters.

5. A motor as defined by claim 3, said first means comprising approximately half of said holes, said second means comprising the remainder of said holes.

References Cited in the file of this patent

UNITED STATES PATENTS 2,660,030     Santos _____ Nov. 24, 1953